United States Patent [19]

Marsh et al.

[11] 4,047,434

[45] Sept. 13, 1977

[54] BIN DEPTH MONITOR

[75] Inventors: Norman F. Marsh, Auburn; William T. Eng, Springfield, both of Ill.

[73] Assignee: Dickey-john Corporation, Auburn, Ill.

[21] Appl. No.: 655,904

[22] Filed: Feb. 6, 1976

[51] Int. Cl.² .......................................... G01F 23/24
[52] U.S. Cl. ................................................ 73/304 R
[58] Field of Search ............ 73/304 R, 304 C, 290 B; 340/244 C, 246

[56] References Cited

U.S. PATENT DOCUMENTS

| 680,490 | 8/1901 | Martin | 340/244 |
|---|---|---|---|
| 2,385,161 | 9/1945 | Pinkerton | 340/244 |
| 2,541,576 | 2/1951 | Detund | 73/304 R |

FOREIGN PATENT DOCUMENTS 129,582  12/1948  Sweden ............................. 340/246

*Primary Examiner*—Donald O. Woodiel
*Attorney, Agent, or Firm*—Olson, Trexler, Wolters, Bushnell & Fosse, Ltd.

[57] ABSTRACT

A device for monitoring the amount or depth of silage or similar material retained in a silo or like structure is disclosed. A number of sensors are vertically arrayed in and on a silo wall, and each sensor senses the presence or absence of silage in its immediate vicinity. An electrical circuit includes a visual display device such as a liquid crystal display for indicating the amount of material in the silo.

14 Claims, 6 Drawing Figures

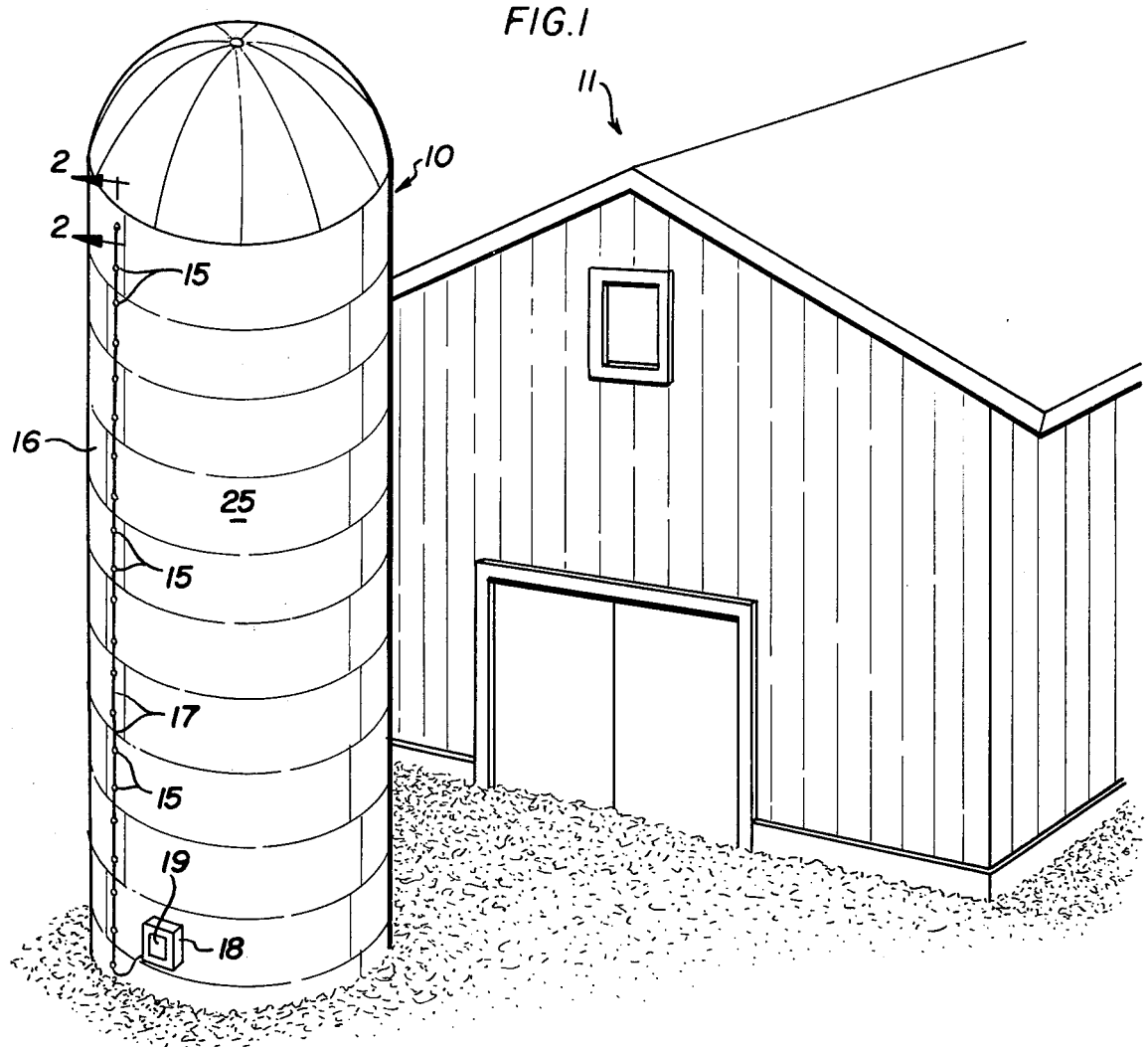
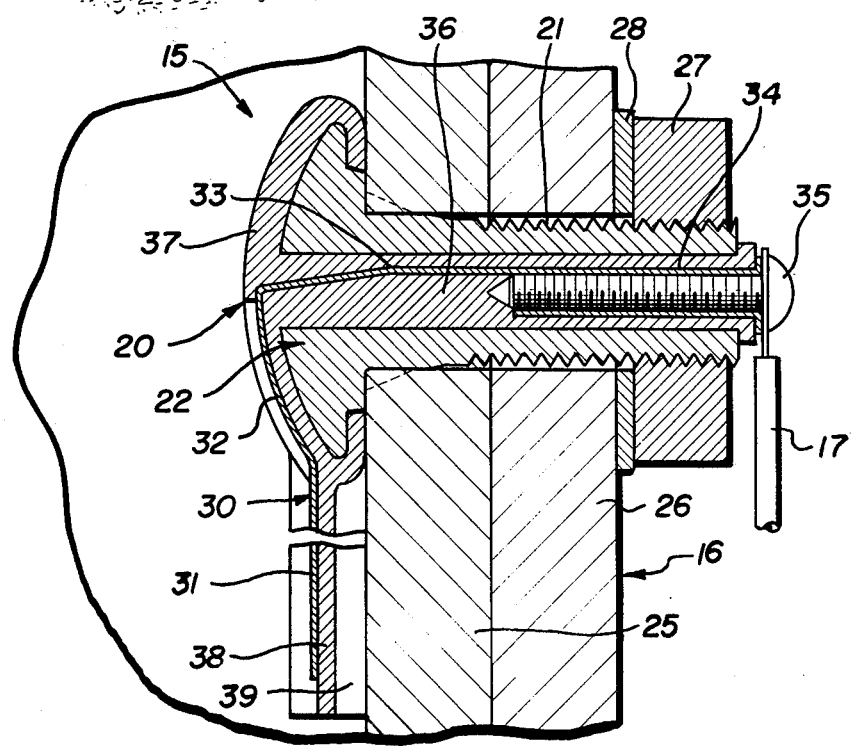
FIG. 1
FIG. 2

FIG. 3
FIG. 4
FIG. 5
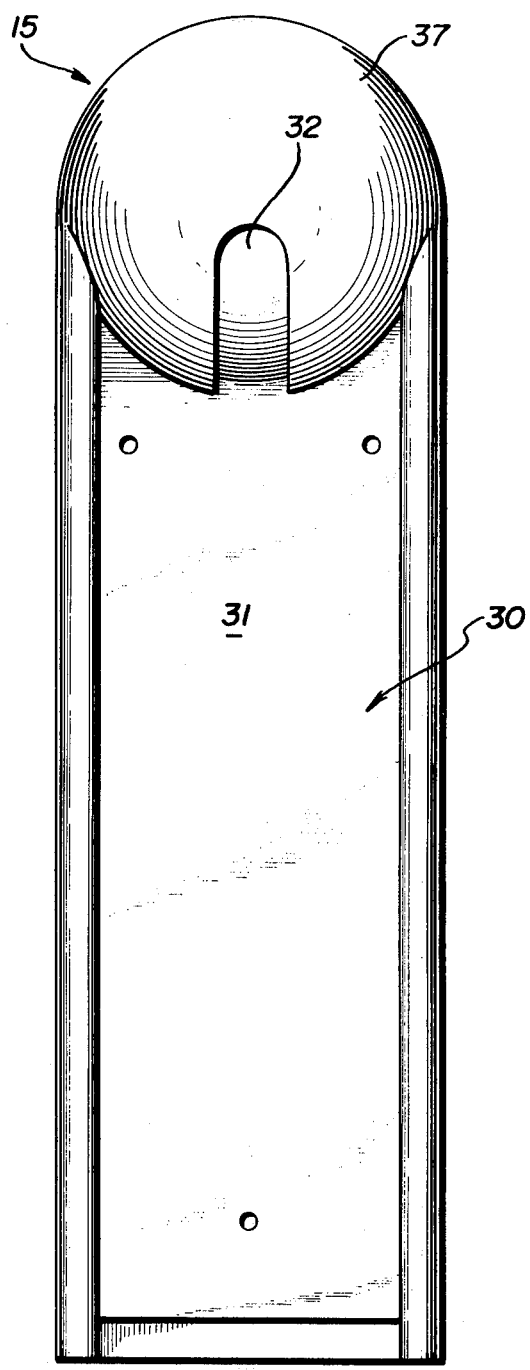
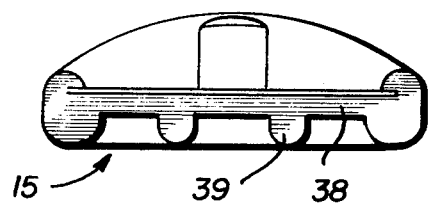
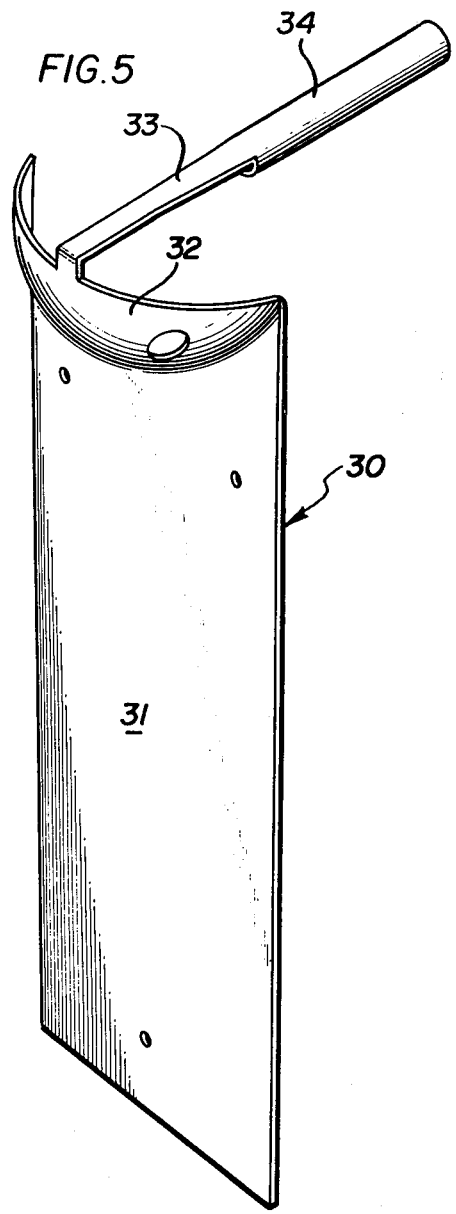

BIN DEPTH MONITOR

BACKGROUND OF THE INVENTION

This invention relates generally to measuring devices, and more particularly concerns devices for indicating the amount or depth of silage or similar material retained in a silo or like walled storage structure.

In modern agriculture, animal husbandry operations contemplate the collection and storage of animal feed such as silage in silos or other like enclosures. This silage feed material is, of course, regularly dispensed to animals during winter months or at other times when fresh feed is not available or its provision to the animals is undesirable. In using such systems, the husbandman must keep a careful account of the amount of silage material still available and stored within the silo or other structure.

It is accordingly the general object of the present invention to provide a commercially attractive device for monitoring the depth of silage or similar material stored within a silo or like structure. When the depth of stored silage is known, data regarding the total amount of silage available can be easily derived.

A more specific object of the invention is to provide such a silage depth monitoring device which is highly accurate in its measuring capability, and which provides a correspondingly accurate indication of the amount of material still retained within the storage silo.

Another object is to provide such a silage depth monitoring device which can be confidently expected to provide a long service life. A related object is to provide a device which requires and includes no moving parts. Another related object is to provide such a device in which the opportunity for inadvertent misadjustment or miscalibration over a period of time is reduced or eliminated.

Yet another object is to provide sensors for use with this monitoring device which are low in cost and which can be easily yet permanently installed within and upon the silo or other storage structure. A related object is to provide such sensor devices which all require but a minimum of maintenance. Another related object is to provide sensors which will not provide false readings due to a moist atmosphere or other conditions.

Still another object is to provide such devices which can be offered to the using public at a low commercially attractive end cost.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing a silo and associated structure with which the present invention is used;

FIG. 2 is a fragmentary sectional view of the silo wall and an associated monitor sensor;

FIG. 3 is an end view of the sensor;

FIG. 4 is a top view of the sensor;

FIG. 5 is a perspective view of a sensor probe element; and

DETAILED DESCRIPTION

Figure 6:
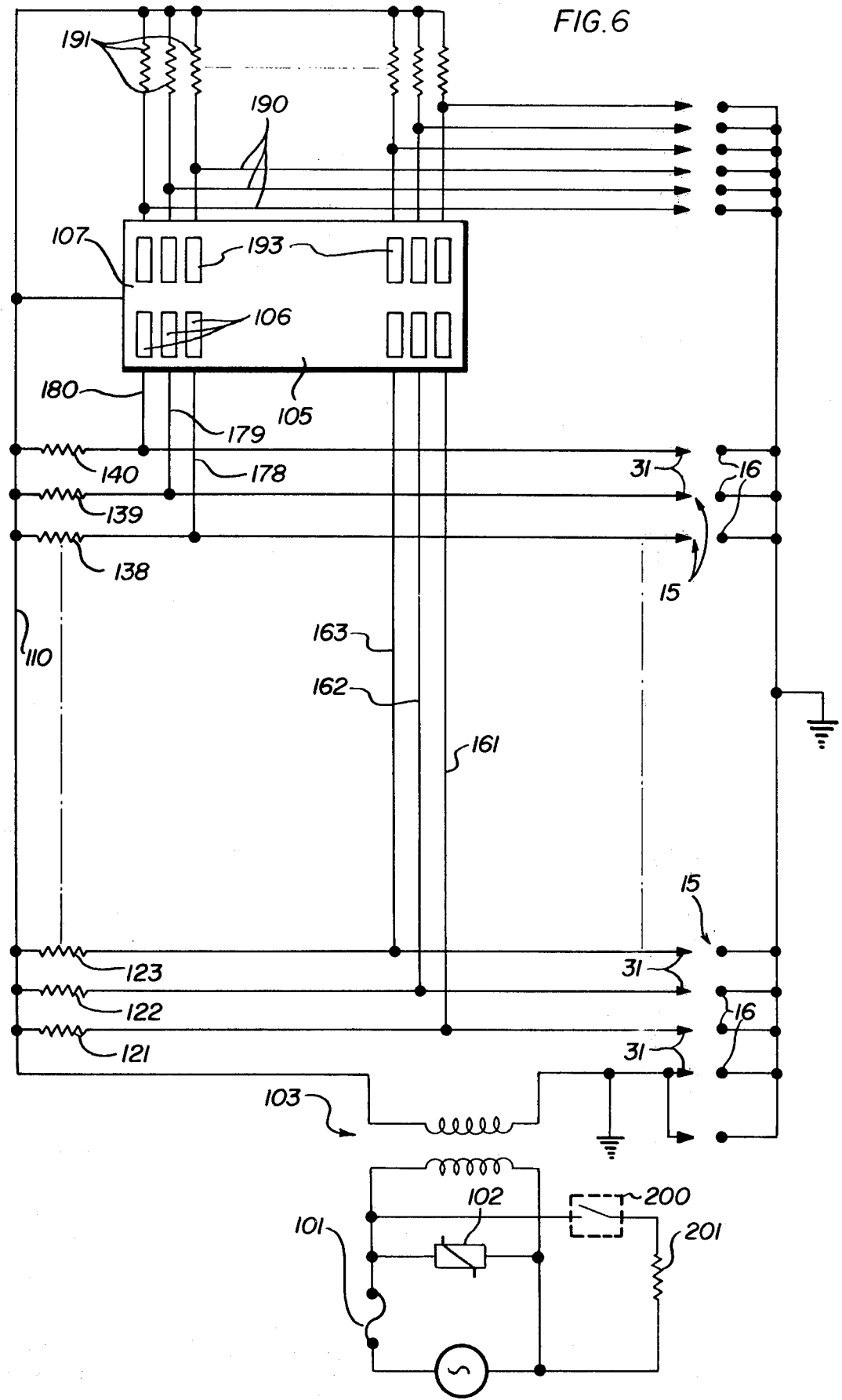
FIG. 6 is a diagram showing, in schematic form, an electrical circuit which can be used in connection with the present invention.

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIG. 1, there is shown a silo 10 in which a quantity of silage or other animal feed material is stored. Known devices (not shown) periodically convey portions of this stored material to an associated animal housing structure such as a barn 11. As the feed material is conveyed away from the silo 10, the quantity or vertical depth of material remaining in the silo will, of course, correspondingly decrease.

To measure the depth of silage remaining within the silo 10 in accordance with the invention, a plurality of sensors 15 are vertically arrayed along a silo wall 16. As explained below, each of sensors 15 is adapted to sense the presence or absence of stored silage in the space immediately adjacent the sensor. Electrical lead wires 17 extend from each sensor 15 to an electrical circuit which can be conveniently located in a housing 18. This circuit, which is more fully described below, generates electrical signals corresponding to the number of sensors at which the presence or stored material is sensed. The generated signals are routed to a display device which can be mounted behind a window 19 for providing a display corresponding to the electrical signals and the number of sensors at which the presence of stored silage material is sensed. It will be understood that the circuit and display housing 18 can be located at any convenient location such as that illustrated here, or within the barn 11, or elsewhere.

In the illustrated embodiment, some twenty of these sensors 15 are vertically arrayed from the top of the silo 10 to its bottom. To provide further measuring data, a second array of sensors (not shown) can be vertically arrayed at a diametrically opposite location on and in the silo. As silage is removed from the silo, the level of remaining silage will drop or decrease. Thus, if the presence of silage is sensed at only the lower ten of these twenty sensors, a visual display will be provided indicating that the silo 10 is half or 50% full of silage.

As illustrated in FIGS. 2-5, these sensors 15 here comprise a bolt 20 having a threaded shank 21 and an enlarged head 22 which is adapted to retain the bolt 20 in and on the wall 16 of the silo 10. In installations where this silo wall 16 comprises a number of arcuately shaped plates 25 and 26 which are assembled to form the completed silo 10, this bolt 20 can conveniently be fitted through appropriate apertures in the plates 25 and 26 so as to act as a combination sensor and fastener and to assist in holding the wall plates together. A mating nut 27 or other convenient fastener securing device can be threaded upon the shank 21 to secure the fastener 20 in place within and upon the plates 25 and 26. A washer 28 is included to spread fastening loads.

This bolt 20 carries an electrical probe which, together with the electrically grounded wall 16, forms an electrical structure in the nature of an open switch. This switch structure can be closed and current caused to flow by the introduction of silage or other electrically conductive material in a path leading from the sensor 15 to the wall 16. Here this probe takes the form of a depending metal tongue 30, as shown in FIG. 5. A generally planar depending probe plate 31 forms, at its upper end, a partially spheroidal head 32 shaped to conform to the bolt head 20 as described below. From this spheroidal head 32, a bridge 33 extends in the axial direction of the bolt shank 21. At a free end, the probe bridge is rolled to form a tube 34 which is adapted to engage an electrical contact screw 35. The screw 35 secures the lead wire 17 in contact with the bridge 33 and probe plate 31, thus forming an electrical path extending from outside the silo through the bolt sensor fastener and into the silo.

To properly insulate the structure, the bolt 20 is provided with an electrically nonconductive axially central portion 36 formed of plastic filler or other material. As illustrated in FIG. 2, the bolt head 20 is also insulated with a plastic material 37. To permit the electrical probe plate 31 to depend downwardly from the bolt 20 at a position closely adjacent the silo wall 16 and yet be maintained in a position spaced apart from the wall, a plastic backing 38 and spacing ribs 39 extend downwardly along the length of the probe 31.

An electrical circuit which can be used with this invention is shown in FIG. 6. Power from a standard 120 volt A.C. source is applied through a fuse 101 across a varistor 102 and a grounded step-down transformer 103 to provide a 12-volt alternating current potential for operating a liquid crystal display 105. As is well known, liquid crystal segments 106 will be displayed or become visible if the segments are maintained at a voltage different from that of the liquid crystal display back plane 107. Here a wire 110 maintains this back plane at a 12 volt A.C. potential.

As explained above, when no silage is located in the immediate vicinity of a given sensor probe plate 31, no current will flow between that probe plate 31 and the adjacent ground formed by the conductive silo wall 16 or another conductive member (not shown) which can be buried in the silage material. When the presence of silage provides an electrically conductive path between the given probe plate 31 and the silo wall 16 or other grounded conductive member in the silage, current flows through a mated voltage-dropping resistor 121-140 to produce a decrease in the voltage applied to corresponding lead wires 161-180. Thus, it will be understood that, as to those sensors 15 which sense the presence of silage in the immediate vicinity of the sensor, a voltage potential will be applied to the corresponding liquid crystal bar display segments 106. Similar circuitry including lead wires 190 and voltage dropping resistors 191 can be used to actuate corresponding display segments 193 from the second series of sensors for a second bar-type presentation in the analog bar graph display 105.

To provide for monitor device operation at even low temperatures when the liquid crystal display duel bar graph device 105 would otherwise be rendered inoperative, a thermostat 200 can be energized by the standard power source. This thermostat 200 can be set to operate at a given temperature such as 32° F. so as to energize a power resistor 201 and warm the adjacent liquid crystal display 105.

The invention is claimed as follows:

1. A monitor for displaying information related to the depth of material stored in a walled silo or the like, comprising a plurality of sensors in a vertical array along a silo wall, each sensor being adapted to sense the presence or absence of stored material at the sensor, electrical circuit means connected to the sensors for generating a plurality of electrical signals, one of said signals comprising a back plane voltage for a liquid crystal display, and another of said signals comprising a first voltage different from said back plane voltage and corresponding to the presence of stored material for each sensor where material is present and a second voltage the same as the back plane voltage corresponding to the absence of stored material for each sensor where material is absent, and liquid crystal display means connected to the electrical circuit means for receiving said back plane and first and second voltages for providing a display corresponding thereto and to the number of sensors at which the presence of stored material is sensed.

2. A monitor according to claim 1 in which at least one sensor includes a fastener having a shank adapted to extend through said silo wall, and an enlarged head adapted to retain the sensor device in and on the silo wall, a depending probe member inside the silo but spaced electrically from the silo wall, and means forming an electrical path extending from outside the silo through the sensor fastener and into the silo to sense the presence or absence of electrically conductive material at the sensor.

3. A monitor according to claim 1, wherein said liquid crystal display means includes means for displaying data in the form of at least one analog bar graph.

4. A monitor according to claim 1 including heater means for heating the display means to maintain display means operation below a given temperature.

5. A monitor according to claim 4 including means for automatically energizing said heater means below said given temperature.

6. For use with a walled silo or the like, an electrical sensor comprising a fastener having a shank adapted to extend through said silo wall, said fastener further having an enlarged head disposed inside the silo wall and adapted to retain the sensor in and on the silo wall, a probe depending inside the silo but spaced electrically from the silo wall, and means forming an electrical path extending from outside the silo through the sensor fastener and into the silo to sense the presence or absence of electrically conductive material at the sensor.

7. A sensor according to claim 6 wherein said probe comprises a plate member depending from the fastener head.

8. A sensor according to claim 7 wherein said means forming an electrical path includes a bridge member connected to the plate member and a tube member connected to the bridge member.

9. A sensor according to claim 8 wherein said tube member is adapted to engage a screw for forming said electrical path extending from outside the silo.

10. A sensor according to claim 6 including electrically insulating material for electrically insulating said probe and electrical path means from said fastener.

11. A sensor according to claim 6 including electrically insulating probe backing means affixed to the probe and positioned between the probe and the silo wall to form an electrical structure in the nature of an open switch closable by the introduction of electrically conductive material leading from said sensor to said silo wall.

12. For use with a walled silo or the like, an electrical sensor comprising a fastener having a threaded shank adapted to extend through said silo wall, said fastener further having an enlarged head disposed inside the silo wall adapted to retain the sensor in and on the silo wall, a probe depending inside the silo but spaced electrically from the silo wall, and means forming an electrical path extending from outside the silo through the sensor fastener and into the silo to sense the presence or absense of electrically conductive material at the sensor.

13. A sensor according to claim 12 wherein said threaded fastener shank has an axial length sufficient to extend through a plurality of plates comprising said wall member whereby to fasten the plates together.

14. A sensor according to claim 13 wherein said sensor includes nut means adapted to be threadably secured upon the fastener shank to secure the sensor fastener, and at least one silo wall plate together in a rigid assembly.

* * * * *